United States Patent [19]
Missout et al.

[11] Patent Number: 4,619,107
[45] Date of Patent: Oct. 28, 1986

[54] WHEEL FOR DRAWING HELICAL GROOVE RING FOR OPTICAL FIBERS

[75] Inventors: Bernard M. Missout; Jean-Pierre Michaux; Jean-Luc A. Piova, all of Paris, France

[73] Assignees: Societe Anonyme de Telecommunications; Societe Industrielle de Liaisons Electriques, both of Paris, France

[21] Appl. No.: 739,044

[22] Filed: May 29, 1985

[30] Foreign Application Priority Data

May 30, 1984 [FR] France ............... 84 08531

[51] Int. Cl.⁴ .............. H01B 13/02; G02B 6/04
[52] U.S. Cl. .................. 57/6; 57/3; 57/13; 57/293; 57/294
[58] Field of Search .............. 57/6, 13–15, 57/19, 3, 9, 264, 293, 294

[56] References Cited

U.S. PATENT DOCUMENTS 4,359,857 11/1982 Oestreich ............... 57/294 X
4,385,485 5/1983 Yonechi ................. 57/13
4,386,496 6/1983 Oestreich ............... 57/293
4,388,799 6/1983 Vives .................... 57/6
4,448,015 5/1984 Usui ..................... 57/3
4,470,248 9/1984 Nortenius ............... 57/6 X
4,497,164 2/1985 Dotti et al. ............ 57/13 X Primary Examiner—John Petrakes
Attorney, Agent, or Firm—Laubscher & Laubscher

[57] ABSTRACT

A drawing wheel is intended for exerting tension on a grooved ring while optical fibers are being laid in helical grooves in the core, in order to stretch the ring in a cabling line. The invention is aimed at defining a radius for the wheel in terms of the dimensional characteristics of the ring so that the fibers are kept longer than the grooves as the ring leaves the cabling line and reverts to an initial tension-free state. The radius of the wheel is such that $$R' > (p^2/(4\pi^2 r)) - (r+h)$$

where p and h respectively denotes pitch and depth of the helical grooves, and r denotes radius of a central portion of the core circumscribed by bottoms of the grooves. The wheel radius is preferably on the order of one meter or more.

2 Claims, 6 Drawing Figures

WHEEL FOR DRAWING HELICAL GROOVE RING FOR OPTICAL FIBERS

BACKGROUND OF THE INVENTION

1. Field of the Invention

The present invention relates to a wheel for drawing a ring having helical grooves each containing at least one optical fiber.

2. Description of the Prior Art

Such a drawing wheel is arranged at the output end of a cabling line in which optical fibers are automatically introduced in the helical grooves of the ring. The drawing wheel is intended for exerting a pull on the ring while the fibers are being introduced in order to stretch the core. This therefore results in an excess length of the fibers with respect to the ring when the latter leaves the line and reverts to its initial state ready for use.

Known drawing wheels carry a small radius, on the order of 20 cm. Experience shows, as do the calculators as will be seen hereinafter, that these small drawing wheels attenuate, or indeed cancel out the excess length sought after in the fibers due to the fact that the fibers in the ring around the drawing wheel follow a shorter patch than the helical run of the bottom of the grooves.

OBJECTS OF THE INVENTION

The main object of this invention is, precisely, to overcome this drawback.

Another object of this invention is to provide a drawing wheel having a radius defined in terms of dimensional characteristics of the ring such that the excess length of the fibers sought after is kept at the output from the drawing wheel.

SUMMARY OF THE INVENTION

Accordingly, there is provided a drawing wheel having a radius R' such as:

$$R' > (p^2/(4\pi^2 r)) - (r+h)$$

where p and h denote pitch and depth of the helical grooves respectively, and r denotes radius of a center portion of the ring circumscribed by groove bottoms. The radius R' of the drawing wheel is preferably on the order of one meter or more.

BRIEF DESCRIPTION OF THE DRAWING

The foregoing and other objects and advantages of this invention will be apparent from the following detailed description of this invention with reference to the corresponding accompanying drawings in which.

DESCRIPTION OF THE PREFERRED EMBODIMENTS

Figure 1:
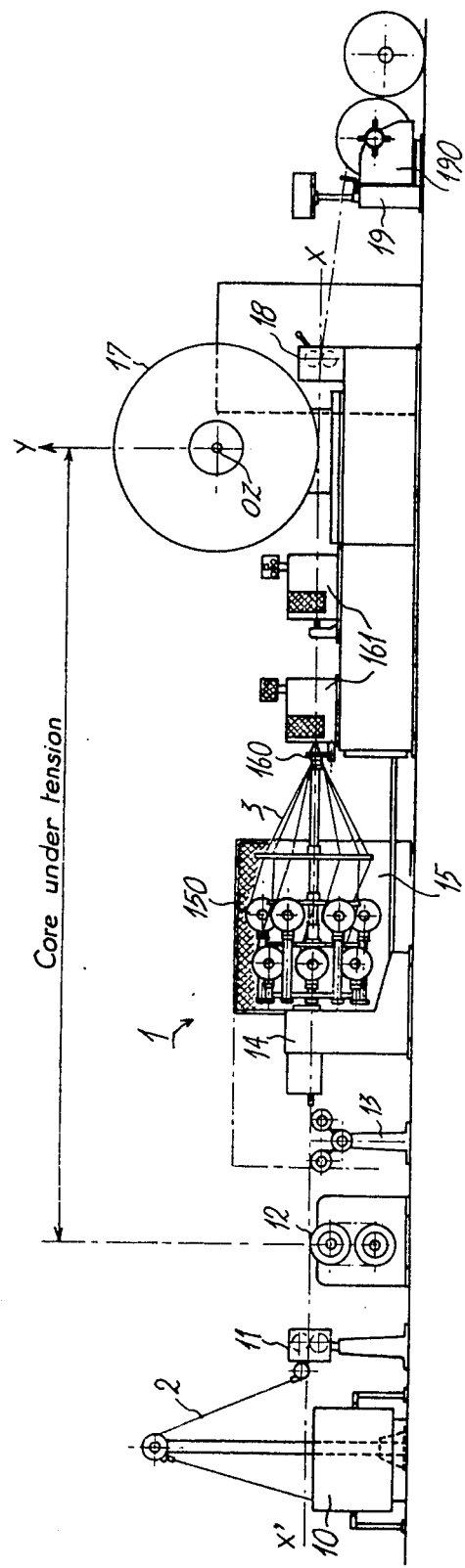
FIG. 1 is a schematic longitudinal view of a cabling line for optical fibers in a grooved ring.

With reference to FIG. 1, an optical fiber cabling line 1 comprises upstream a pay-out stand 10 in the form of a vertical drum that pays out a grooved cylindrical ring 2 made of a thermoplastic material obtained by extrusion, enveloping where necessary a central strengthening carrier that includes one steel wire or several twisted steel wires. The ring 2 carries parallel helical grooves 20 equally spaced out around the periphery of the ring. Each groove is designed to contain at least one optical fiber 3. In the embodiment depicted in FIG. 2 there are ten parallel grooves 20. The grooves follow continous parallel helical paths having a very long pitch compared to the diameter of the ring, typically in a ratio of approximately 30 to 60. The grooves can successively comprise direct helical sections and retrograde helical sections.

Ring 2 leaving the pay-out stand 10 is unrolled between tension wheels 11 and runs over a braking wheel 12. The ring 2 is linearly drawn and is subjected to a tensile load along a horizontal axis X'X longitudinal to the cabling line from the braking wheel 12 to a drawing wheel 17. Between wheels 12 and 17, ring 2 successively runs through a device 13 for measuring the tension in the ring, a slaving device 14 including teeth meshing with the ring grooves to slave the rotational speeds of the rotating units 15, 160 to the translational speed of the ring and more exactly to the helical ring groove pitch number per second, a rotating holder 15 provided with pay-out spools 150 delivering fibers, an optical fiber rotating dispenser 160 containing fiber-guides for respectively feeding optical fibers 3 into the ring grooves 20, and one or more taping units 161 for winding one or more protective sheathing tapes 4 made of terphane for example, around the ring containing the fibers. The taped ring is wound several times around the drawing wheel 17 that has the form of a big disk tangential to the axis X'X and rotating about a transversally and horizontally extending rotational axis OZ. Ring 2 then runs between counter-tension wheels 18 and is wound around a reel 190 in a winding device 19 at an output end of the cabling line 1.

In the cabling line, ring 2 is subjected to a tension between the braking wheels 12 and the drawing wheel 17 while the fibers 3 are being laid in the ring grooves 20. At the output from the cabling line, at the counter-tension wheels 18, ring 2 shrinks substantially to its initial length. The fibers thus carry an excess in length over the length of the grooves 20 and thus follow a meandering path in the grooves. The fibers are therefore not exposed to any strain, due particularly to cable expansion in high temperatures or tension during later operations such as coiling, laying and applicational use of the optical fiber cable submitting said cable to stretching for example.

To immobilize each fiber in the respective core groove by friction, it is necessary to provide for a length of core approximately 15 m downstream of the fiber-guides, between the dispenser 160 and the winding device 19, in view of the vibrations generated by the various mechanisms in the cabling line and the tension applied to the fibers. When the fiber is not yet immobilized still by friction in the core groove, the fiber is subjected to the tension of the respective pay-out spool 150. The fiber therefore has a tendency to assume a lie of minimum length.

Figure 2:
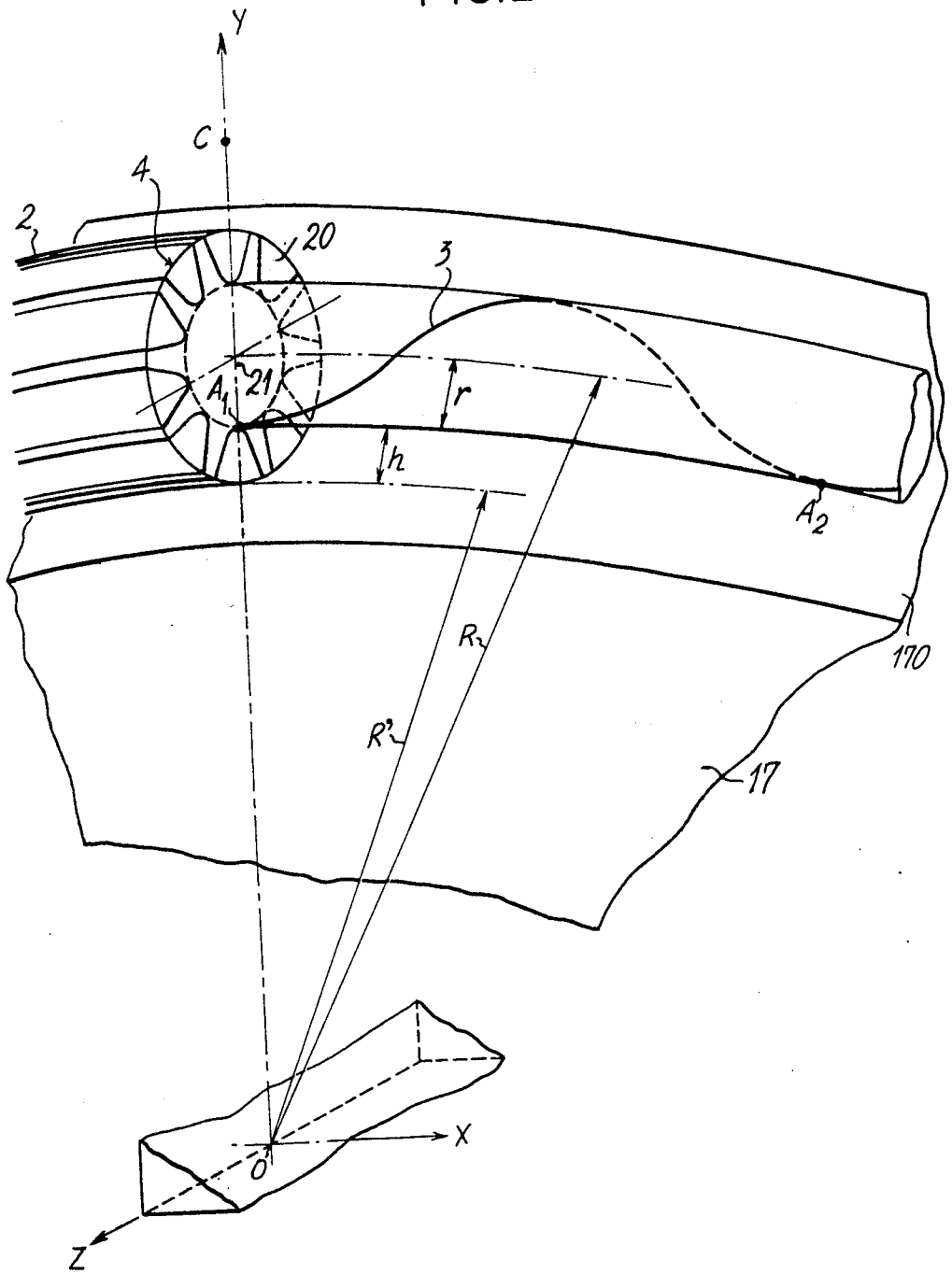
FIG. 2 is a perspective view of a section of the ring disposed around the periphery of the drawing wheel.

On the face of it, as shown in FIG. 2, the fiber 3 in the core 2 wound around the drawing wheel 17 follows a curvilinear helix coincident with the path in the bottom of the corresponding groove 20. However, the center of curvature of the curvilinear helix at a point $A_1$ in the immediate proximity of the periphery 170 of the drawing wheel 17 varies in terms of the drawing wheel radius, as demonstrated hereinafter by calculation for the radius of curvature at point $A_1$.

In the prior art, the radius of the drawing wheel is small and less than a critical radius defined hereafter, which results in a center of curvature at the point $A_1$ located between center O of the wheel 17 and the point $A_1$. The fiber is then in press contact sometimes with the drawing wheel periphery sometimes with a central portion 21 of the ring circumscribed by the bottoms of the groove 20. The length of the helix described by the fiber is thus smaller than the length of the helix running around the central portion of the ring alone, i.e. described by the bottom of the groove. As a result, in the prior art, the fiber can be shorter than the groove thus causing undesirable tension in the fiber which may cause the fiber to break when the ring reverts to its initial length upon leaving the line. This phenomenon is contrary to the aim of the exercise, namely an excess in fiber length with respect to the groove.

Figure 3:
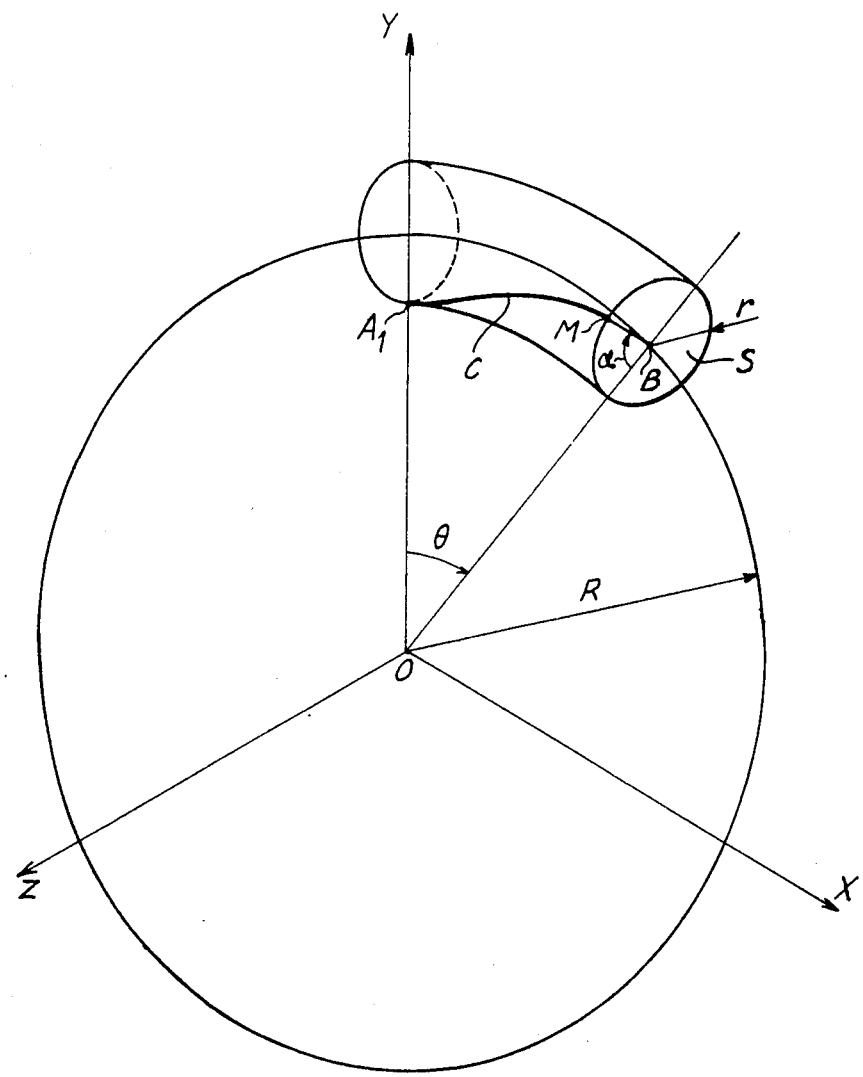
FIGS. 3 and 4 are schematic perspective and planar projection views of the wheel to show a portion of a helix followed by a ring groove bottom in a three-dimensional Cartesian reference frame used for calculating the radius of the drawing wheel as in the invention, respectively.
Figure 4:
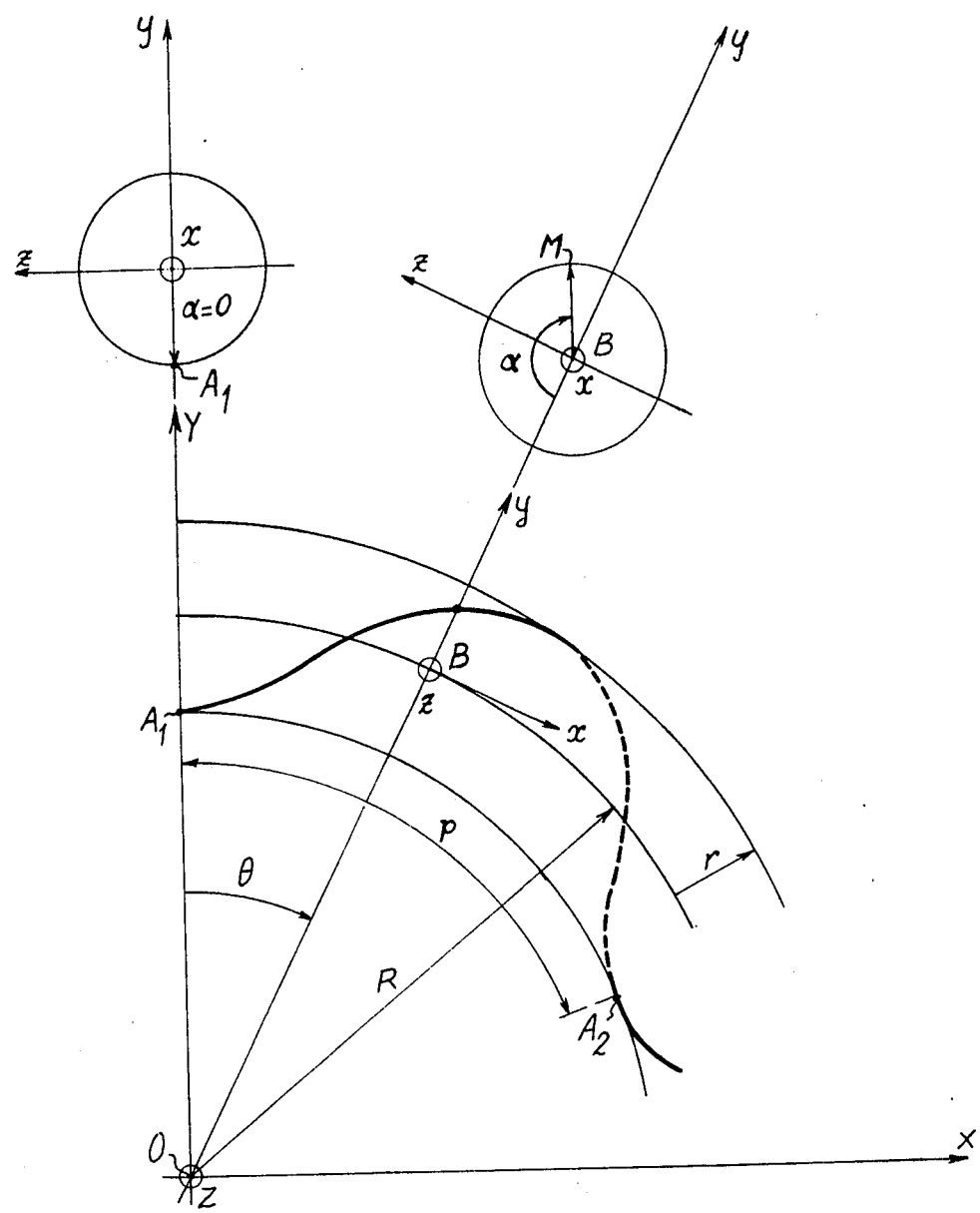

The radius of curvature at any point M on a curvilinear helix C described by the bottom of a groove 20 in the ring 2 wound around the drawing wheel 17 is calculated below in reference to FIGS. 3 and 4. The helix C is centered on the circumference of a circle having a radius R and disposed in a vertical plane XOY lying in a Cartesian reference frame XYZ. An ordinate axis OY in the reference frame runs through point $A_1$ on the helix C located on a small circle of radius $(R-r)$. A level axis OZ in the reference frame is coincident with the rotation axis of the wheel 17. Helix C turns about a torus defined by the axis OZ and a radius $R=\overrightarrow{OB}$ equal to the sum of the wheel 17 radius R' and the radius $(r+h)$ of the ring, as shown in FIG. 2. A diametral cross-section S of the torus containing the point M has a radius equal to that of the core central portion 21 and has a center B on the circle of radius R. The point M can be defined by following spherical coordinates:

$\overline{OM}$ = distance from the center O to the point M:
$\theta$ = angle between $\overrightarrow{OY}$ and $\overrightarrow{OB}$ varying between 0 and $2\pi$ for a complete turn of the point M about the drawing wheel;
$\alpha$ = angle between $\overrightarrow{BO}$ and $\overrightarrow{BM}$ varying between 0 and $2\pi$ for a path of the point M equal to the pitch p of the helix C.

On the basis of the vectorial relationship:

$$\overrightarrow{OM} = \overrightarrow{OB} + \overrightarrow{BM}$$

coordinates X, Y and Z of the point M are deduced in the Cartesian reference frame XYZ:

$X = R \sin\theta - r \cos\alpha \sin\theta$ $Y = R \sin\theta - r \cos\theta \cos\alpha$ \hfill (1)

$Z = r \sin\alpha$

If k denotes a pitch number, generally fractional, for one turn of the helix C about the drawing wheel 17, angles $\alpha$ and $\theta$ are related as follows:

$\alpha = k \cdot \theta$ with $k = (2\pi R)/p$

By replacing $\alpha$ in the equations (1), the result is:

$X = R \sin\theta - r \cos k\theta \sin\theta$ $Y = R \sin\theta - r \cos\theta \cos k\theta$ \hfill (2)

$Z = r \sin k\theta$

Using one of the fundamental Frenet-Serret relationship:

$$\overrightarrow{dT/ds} = \overrightarrow{N}/\rho$$

where $\overrightarrow{dT/ds}$ denotes growth rate of a unit vector $\overrightarrow{T}$ tangential to any point M on a curvilinear curve with respect to a curvilinear abscissa s measured from this point, $\overrightarrow{N}$ a unit vector normal to the curve and $\rho$ a radius of curvature of the curve, the curvature $1/\rho$ of the curve is specified by the following formula:

$$\frac{1}{\rho} = \frac{((X'^2 + Y'^2 + Z'^2)(X'^2 + Y'^2 + Z'^2) - (X'X'' + Y'Y'' + Z'Z'')^2)^{1/2}}{(X'^2 + Y'^2 + Z'^2)^{3/2}}$$

in terms of partial derivatives of the first order X', Y', Z' and partial derivatives of the second order X'', Y'', Z'' for the co-ordinates of point M with respect to the angle $\theta$. The first and second order partial derivatives are deduced from the equations (2):

$X' = \frac{dX}{d\theta} = R\cos\theta + rk \sin k\theta \sin\theta - r \cos k\theta \cos\theta$ $Y' = \frac{dY}{d\theta} = -R \sin\theta + r \sin\theta \cos k\theta + rk \cos\theta \sin k\theta$ $Z' = \frac{dZ}{d\theta} = rk \cos k\theta$ $X'' = \frac{d^2X}{d\theta^2} = -R \sin\theta + rk(k \cos k\theta \sin\theta + \sin k\theta \cos\theta) +$ $r(k \sin k\theta \cos\theta + \sin\theta \cos k\theta)$ $Y'' \frac{d^2Y}{d\theta^2} = -R \cos\theta + r(\cos\theta \cos k\theta - k \sin k\theta \sin\theta) -$ $rk(\sin\theta \sin k\theta - k \cos\theta \cos k\theta)$ $Z'' = \frac{d^2Z}{d\theta^2} = -rk^2 \sin k\theta$ For points $A_1$, $A_2$, . . . located on circles of radius $(R-r)$ and opposite the periphery 170 of the drawing wheel, and hence defined for $\alpha = 2\pi N$ et $\theta = (Np)/R$, where N is an integer greater than or equal to zero, the above derivatives are given by:

$X' = (R - r) \cos\theta$ \qquad $X'' = (-R + r(1 + k^2)) \sin\theta$ $Y' = (-R + r) \sin\theta$ \qquad $Y'' = (-R + r(1 + k^2)) \cos\theta$ $Z' = rk$ \qquad $Z'' = 0$ The curvature of the helix C at the points $A_1$, $A_2$, therefore becomes in using the above formula:

$$\frac{1}{\rho} = \frac{r(1 + k^2) - R}{(R - r)^2 + k^2 r^2}$$

If k is replaced by $(2\pi R/p)$ and b is given by $4\pi^2/p^2$, the corresponding radius of curvature is expressed by the following equation in terms of the radius R and therefore the radius of the drawing wheel:

$$\rho = \frac{R^2(1 + br^2) - 2rR + r^2}{R^2 \cdot br - R + r}$$

The radius of curvature $\rho$ tends to infinity for the values:

$$R = \frac{1 \pm \sqrt{1 - 4br^2}}{2br}$$

Figure 5:
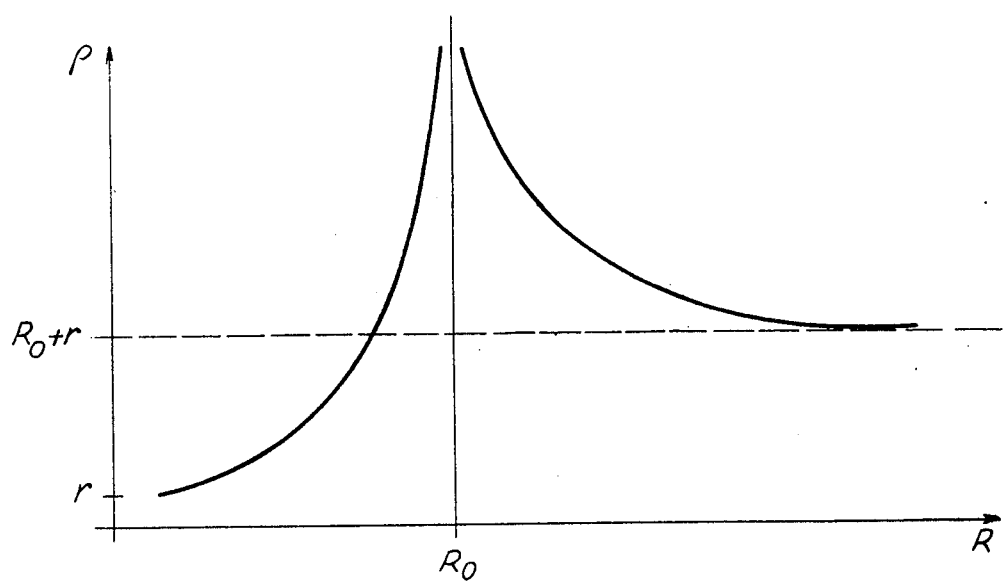
FIG. 5 shows the variation in curvature radius of the helix at a point in the vicinity of the wheel periphery in terms of a radius of a circle about which the helix turns.

In practice, since the term $4\,br^2$ is assumed to be very small compared to unity, the radius of curvature $\rho$ tends to infinity for a critical radius $R_0$ given by:

$$R_0 = p^2/(4\pi^2 r)$$

as shown in FIG. 5. When the radius R tends to infinity, then this results again in the radius of curvature of a circular helix equal to $p^2/(4\pi^2 r)+r=R_0+r$.

Figure 6:
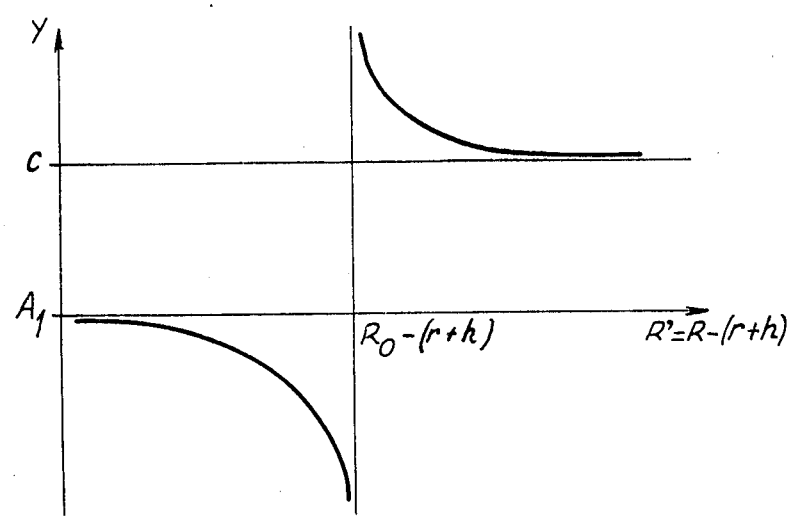
FIG. 6 shows the variation in the position of the center of curvature of said peripheral point in terms of the radius of the drawing wheel.

FIG. 6 depicts the variation in the position of the center of curvature for the helix at the point $A_1$ on the axis OY in terms of the radius R' of the drawing wheel 17 such that $R'=R-(r+h)$. h denotes the depth of the grooves 20, and $(r+h)$ denotes the radius of the ring 2. When $R'<R_0-(r+h)$, the center of curvature lies on an oriented half-line $A_1O$ on the side of the wheel center O, and the fibers 3 in the grooves 20 come into press contact with the periphery of the drawing wheel, which corresponds to a drawing wheel as in the prior art. When $R'>R_0-(r+h)$, which corresponds to a drawing wheel as in the invention, the center of curvature is beyond the point $A_1$, on an oriented half-line $\vec{CY}$ having as origin a point C lying at a distance $(R_0-h)$ away from the point $A_1$. In the invention, the fibers 3 are applied against the bottoms of the grooves 20 and therefore afford an excess length compared to the grooves once the tension exerted on the ring leaving the cabling line has been relaxed.

By way of example, if the pitch p of the ring 2 is smaller than a maximum pitch equal to 200 mm, the radius r of the central portion 21 of the ring is greater than a minimum radius equal to 1.1 mm, and the depth h of the ring grooves 20 is smaller than a maximum depth equal to 0.9 mm, then the radius R' of the drawing wheel must be such that:

$$R' > R_0 = \frac{200^2}{4 \cdot \pi^2 \cdot 1.1} - (1.1 + 0.9) \text{ mm}$$

i.e. R'>919 mm.

In practice, the radius of a drawing wheel embodying the invention is on the order of one meter.

What we claim is:

1. Apparatus for forming an optical fiber cable including a longitudinally stretchable and shrinkable ring member (2) containing a plurality of parallel helical grooves (20) for receiving optical fibers (3), comprising
   (a) means (10) for supplying an indeterminate length of the ring member to a store means (190);
   (b) means for temporarily tensioning an intermediate portion of said ring member between said ring member supply means and said store means, thereby to stretch said intermediate portion, said tensioning means including
      (1) brake wheel means (12) adjacent said supply means for braking the trailing end of said ring intermediate portion; and
      (2) drawing wheel means (17) adjacent said winding means for drawing the leading end of said intermediate portion, the radius (R') of said drawing wheel being such that $$R' = (p^2/4\pi^2 r) - (r+h)$$

where
   p = the pitch of the helical grooves
   h = the depth of the helical grooves
   r = the radius of a central portion of said ring member circumscribed by the bottoms of the grooves; and
   (c) means (150) arranged between said brake wheel means and said drawing wheel means for introducing optical fibers into the helical grooves contained in said stretched intermediate portion, whereby upon shrinkage of said intermediate ring portion after passage through said tensioning means, the optical fibers have a length greater than the length of the corresponding grooves in said ring member.

2. Apparatus as defined in claim 1, wherein the radius (R') of said drawing wheel is at least one meter.

* * * * *